(12) United States Patent
Stone

(10) Patent No.: US 11,327,250 B1
(45) Date of Patent: May 10, 2022

(54) OPTICAL INTERCONNECT DEVICES

(71) Applicant: Wavefront Research Inc., Northampton, PA (US)

(72) Inventor: Thomas W. Stone, Hellertown, PA (US)

(73) Assignee: Wavefront Research, Inc., Northhampton, PA (US)

( * ) Notice: Subject to any disclaimer, the term of this patent is extended or adjusted under 35 U.S.C. 154(b) by 108 days.

(21) Appl. No.: 16/812,454

(22) Filed: Mar. 9, 2020

Related U.S. Application Data

(60) Provisional application No. 62/815,790, filed on Mar. 8, 2019.

(51) Int. Cl.
*G02B 6/38* (2006.01)
*G02B 6/255* (2006.01)

(52) U.S. Cl.
CPC .......... *G02B 6/3885* (2013.01); *G02B 6/2552* (2013.01)

(58) Field of Classification Search
None
See application file for complete search history.

(56) References Cited

U.S. PATENT DOCUMENTS

| | | | | |
|---|---|---|---|---|
| 4,962,988 A * | 10/1990 | Swann | .................. | G02B 6/2551 385/34 |
| 5,050,954 A * | 9/1991 | Gardner | ............... | G02B 6/2938 385/16 |
| 6,635,861 B1 | 10/2003 | Stone | | |
| 7,015,454 B2 | 3/2006 | Stone | | |
| 7,357,005 B2 * | 4/2008 | Matsumura | .............. | G02B 6/32 385/33 |
| 7,400,799 B2 * | 7/2008 | Koishi | ..................... | G02B 6/32 385/33 |
| 7,446,298 B1 | 11/2008 | Stone | | |
| 7,660,502 B1 | 2/2010 | Stone | | |
| 8,171,625 B1 | 5/2012 | Veitch | | |
| 8,350,210 B1 | 1/2013 | Stone | | |
| 9,213,141 B1 | 12/2015 | Stone | | |
| 9,250,385 B1 * | 2/2016 | Onaka | ................ | G02B 6/02042 |
| 9,594,214 B1 | 3/2017 | Stone | | |
| 9,885,840 B2 * | 2/2018 | Ota | ...................... | G02B 6/3885 |
| 9,964,723 B1 | 5/2018 | Stone | | |
| 10,564,363 B1 * | 2/2020 | Corl | ..................... | G02B 6/3803 |
| 2004/0159777 A1 * | 8/2004 | Stone | .................. | G02B 6/4249 250/216 |
| 2004/0252941 A1 * | 12/2004 | Hsia | ....................... | G02B 6/264 385/34 |
| 2011/0274435 A1 * | 11/2011 | Fini | ........................ | H04J 14/02 398/139 |
| 2013/0063809 A1 * | 3/2013 | Nishihara | ........... | H01S 3/06737 359/341.2 |
| 2015/0168642 A1 * | 6/2015 | Mimura | ............. | G02B 6/02042 359/341.3 |
| 2017/0299806 A1 * | 10/2017 | Kopp | ................. | G02B 6/02042 |
| 2020/0064563 A1 * | 2/2020 | Kopp | ...................... | G02B 6/26 |
| 2021/0080644 A1 * | 3/2021 | Yoo | ..................... | G02B 6/02366 |
| 2021/0149119 A1 * | 5/2021 | Juarez Marroquin | . | G02B 6/264 |

\* cited by examiner

*Primary Examiner* — Jerry Rahll
(74) *Attorney, Agent, or Firm* — Culhane Meadows PLLC; Orlando Lopez

(57) ABSTRACT

Improved optical interconnects obtained by replacing one or more single core fibers with one or more multicore fibers. In some instances, at least one of the optical fibers is shaped.

15 Claims, 11 Drawing Sheets

OPTICAL INTERCONNECT DEVICES

CROSS REFERENCE TO RELATED APPLICATIONS

This application claims priority to U.S. Provisional Application No. 62/815,790, entitled OPTICAL INTERCONNECT DEVICES, filed on Mar. 8, 2019, which is incorporated by reference here in in its entirety and for all purposes.

BACKGROUND

These teachings relate generally to optical interconnect devices and, more particularly, to optical interconnect devices that include optical fibers and optical imagers.

Systems including an optical connector comprising an array of optical fibers that is attached to an infinite conjugate imager have been disclosed. A typical optical fiber consists of a core that is a waveguide which carries optical signals. This core is surrounded by a cladding, and the cladding is typically surrounded by one or more coatings and or protective layers. Depending on the dimensions of the core and other parameters the core can be a single mode or multimode core.

Other previous patents have shown a variety of optical interconnect devices that are based on combining arrays of optical fibers with infinite conjugate imagers. Optical fibers can have multiple cores. In one configuration, there are three cores that share a common cladding. These cores may be single mode or multiple mode or a mix of the two.

There is a need for more versatile optical interconnect configurations.

BRIEF SUMMARY

Improved optical interconnects are obtained by replacing one or more single core fibers with one or more multicore fibers. In some instances, at least one of the optical fibers is shaped.

In one or more instances, the optical interconnect of these teachings includes one or more optical fibers where at least one optical fiber from the one or more optical fibers is a shaped optical fiber. One or more of optical fibers of the at least one optical fibers can have a noncircular shape. The optical interconnect of these teachings also includes an imaging subsystem and the imaging subsystem has an optical alignment surface. The optical alignment surface has at least one shaped divot. The at least one optical fiber is aligned by insertion of an end portion into the at least one shaped divot.

In one or more other embodiments, the optical interconnect of these teachings includes a shaped array of optical fibers. The shaped array of optical fibers is aligned by insertion of the end portion into the shaped divot.

For a better understanding of the present teachings, together with other and further objects thereof, reference is made to the accompanying drawings and detailed description and its scope will be pointed out in the appended claims.

DETAILED DESCRIPTION

Figure 1:
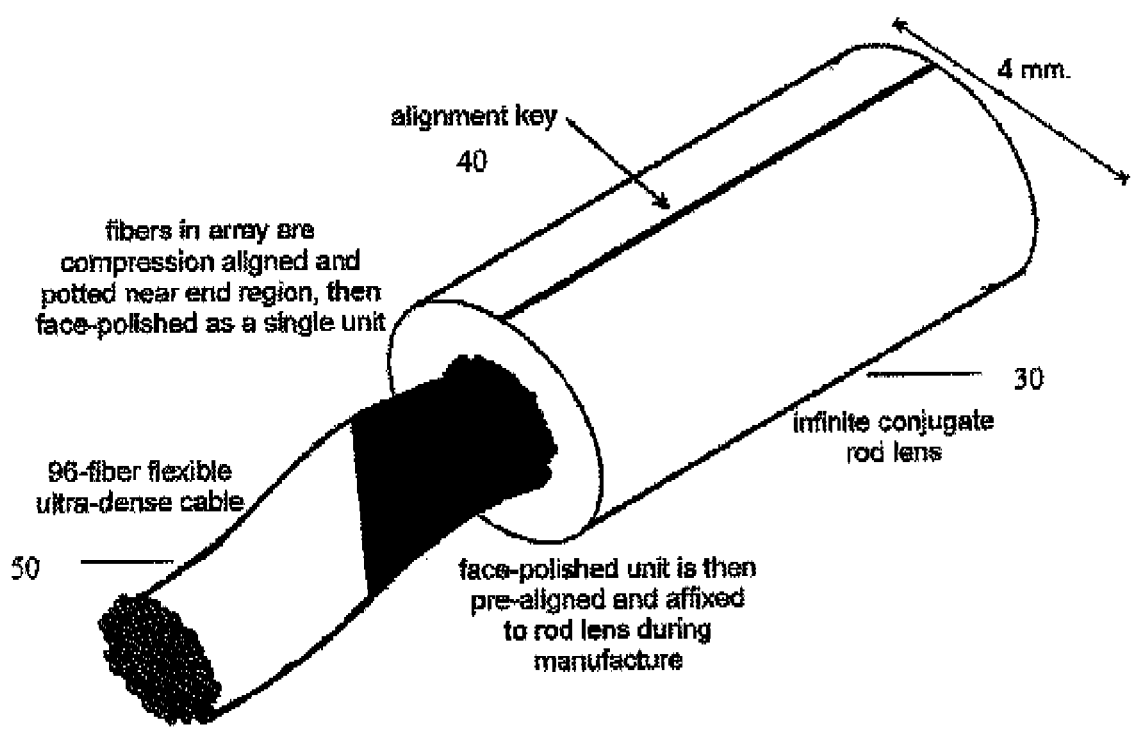
FIG. 1 shows one optical connector that includes an array of optical fibers attached to an infinite conjugate imager.

Reference is made to FIG. 1, which illustrates an optical connector comprising an array of optical fibers that is attached to an infinite conjugate imager as described in U.S. patent application Ser. No. 11/777,170 (which is reproduced in the Appendix); and U.S. Pat. Nos. 7,660,502, 9,213,141, and 9,964,723, all of which are incorporated herein by reference in their entirety for all purposes.

Figure 1A:
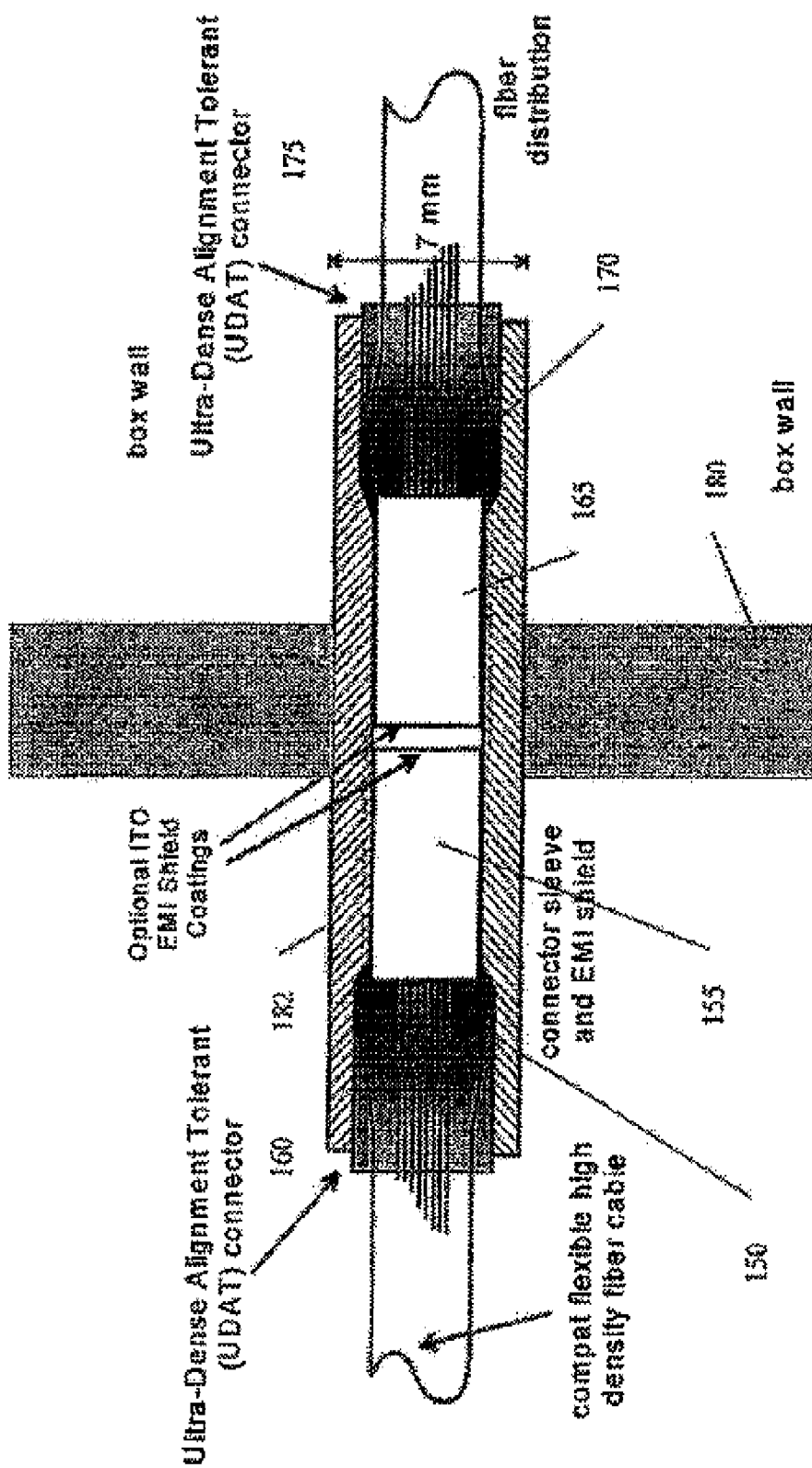
FIG. 1A shows an embodiment of a two connector system of these teachings.

In FIG. 1A, embodiments of a connector system of these teachings 160, 175 are shown coupling 96 fibers 150, 170 to an enclosure 180 with a footprint of only several millimeters.

"Imager," as used herein, refers to a lens or optical system.

"Divot," as used herein, refers to an indented section of an object; the section having a predetermined geometry. Such divots can be for formed, for example and without restriction, by carving out a section of the object near a surface in a predetermined geometry, or by depositing material on an object in a predetermined geometry to form the divot. Divots are also referred to here, without limitation, as indentations.

Optical fibers typically contain cladding around the core, and the cladding is typically coated. Further, the coatings may have more than one layer, and the coated fibers are typically jacketed for further protection. The terms coating and shaped coating referred to herein are, without limitation, are also used to describe jacketing and shaped jacketing, respectively.

These optical connectors also utilize the optical principles in U.S. Pat. Nos. 6,635,361, 7,015,454, 7,446,298, 8,171,625, 9,594,214, and 8,350,210 which are also incorporated herein by reference in their entirety for all purposes. In general, the multicore optical fibers described herein can be substituted in the optical connectors described in these and other references incorporated by reference herein to provide benefits including for example, without limitation, additional data throughput, increased redundancy, improved compactness, reduction in weight, etc.

The references cited above described optical interconnect technology for one or more optical fibers, such as shown in FIG. 1.

Figure 2:
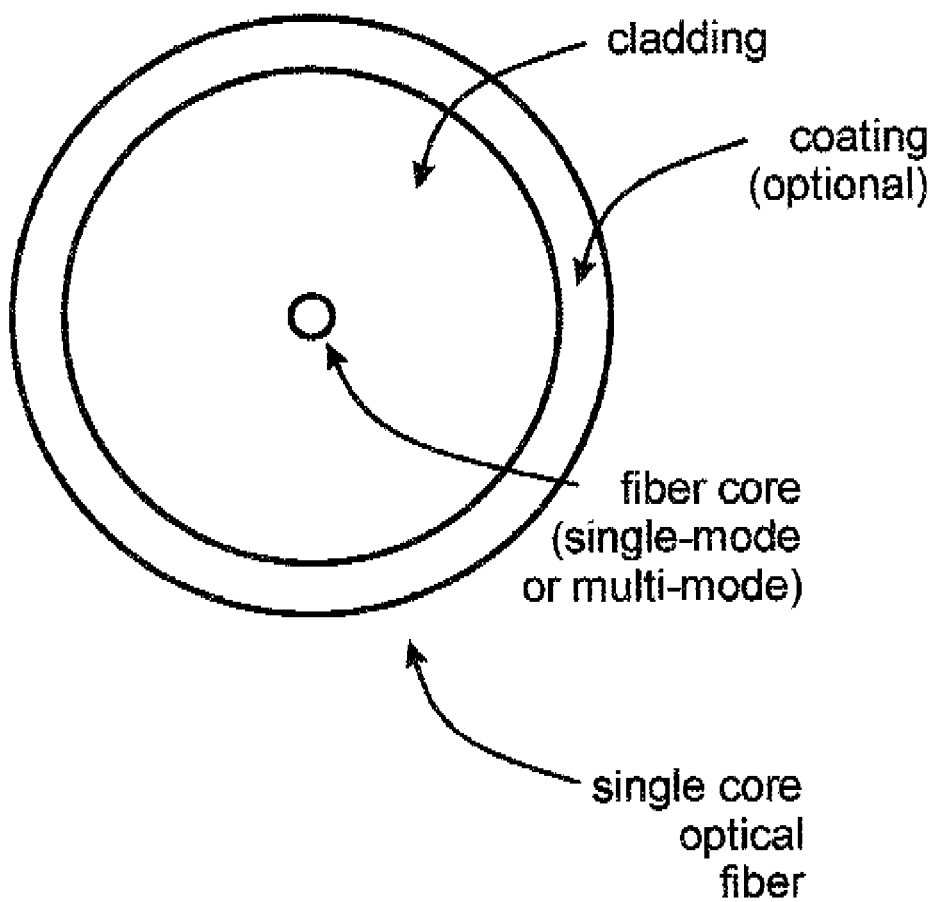
FIG. 2 shows a typical optical fiber.

A typical optical fiber, as shown in FIG. 2, includes a core that is a waveguide which carries optical signals. This core is surrounded by a cladding, and the cladding is typically surrounded by one or more coatings and or protective layers.

Depending on the dimensions of the core and other parameters the core can be a single mode or multimode core. While this optical fiber is shown to be round, other shapes as described below and other waveguide configurations are included in the general term optical fiber use here.

Figure 3:
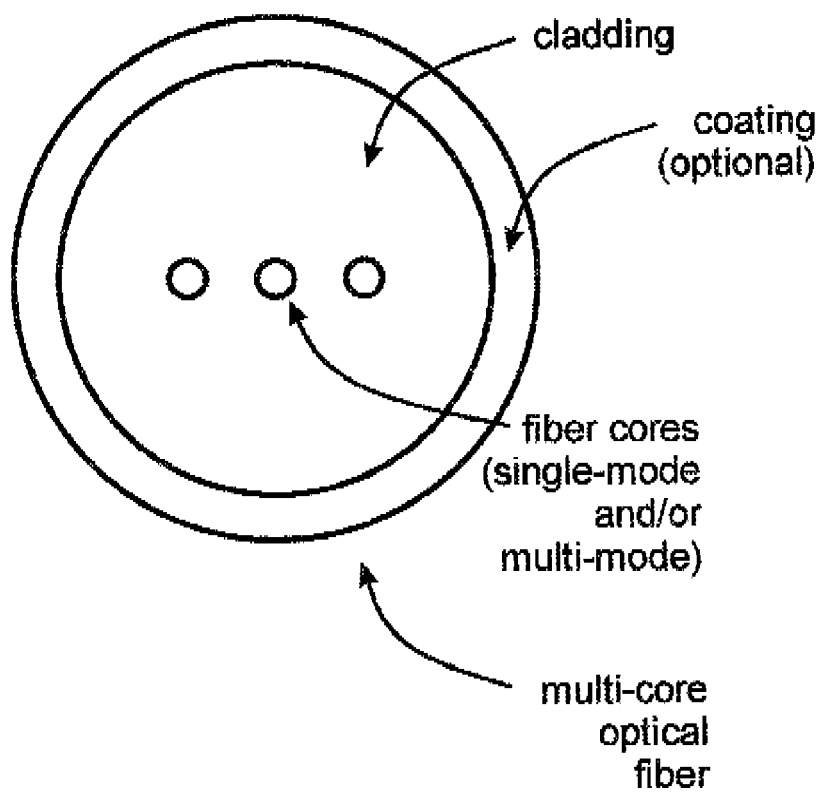
FIG. 3 shows an array of three cores in a linear arrangement.

The other patents that are incorporated by reference above show a variety of optical interconnect devices that are based on combining arrays of optical fibers typically with infinite conjugate imagers. Optical fibers can have multiple cores as shown in FIG. 3. In the configuration shown in FIG. 3 there are three cores that share a common cladding. These cores may be single mode or multiple mode or a mix of the two, and may be arranged in arrays that are symmetric or asymmetric. Each core can contain independent optical signals, or can couple optical signals in one or more cores sharing the same optical fiber.

Figure 4:
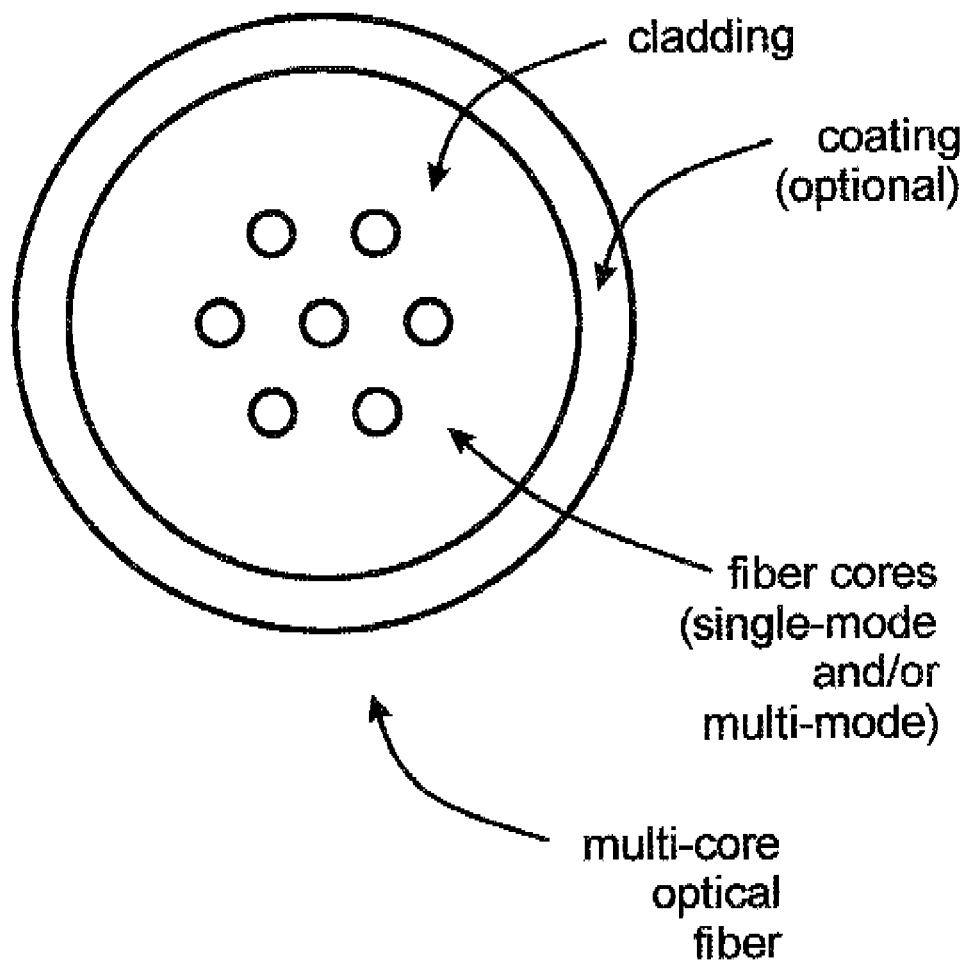
FIG. 4 shows an array of seven cores in a hexagonal geometry.

FIG. 3 shows an array of three cores in a linear arrangement. FIG. 4 shows an array of seven cores in a hexagonal geometry.

Figure 5:
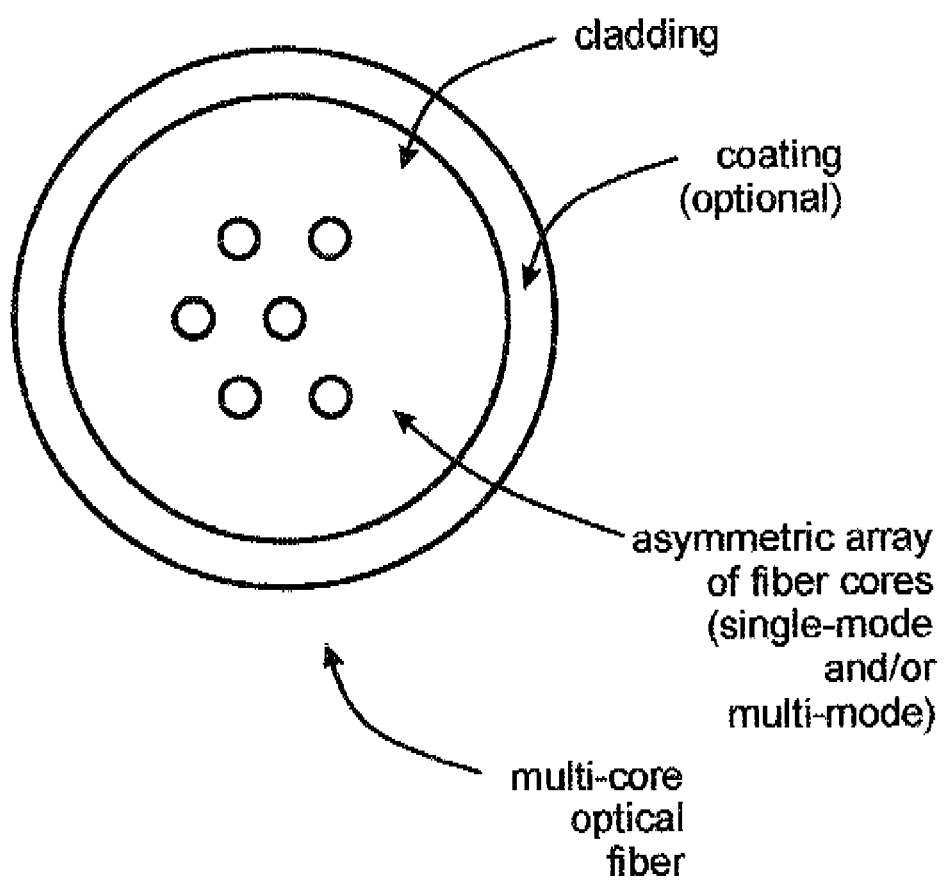
FIG. 5 shows an exemplary asymmetric arrangement of cores in an optical fiber.

In the present teachings, it is sometimes useful to break the symmetry in the arrays of cores so that individual cores are readily identified by their position. One such asymmetric arrangement of cores, in which one member of a hexagonal array of cores has been deleted, is shown in FIG. 5. Alternatively, the symmetry can be broken with the addition of a reference fiduciary, mechanical feature, or optical feature, that is used to identify the orientation of the array of cores in the multicore optical fiber. The optical interconnect technology in the patents incorporated by reference can be improved by replacing one or more single core fibers with one or more multicore fibers according to the teachings herein, and form many of the embodiments of the subject teachings.

In the resulting configurations subgroups of signals traveling along multiple cores in a single multicore fiber can be routed together in the multicore fiber. The array of cores in one or more multicore fiber(s) can be directly substituted in the patents incorporated by reference for the fiber arrays described therein according to the teachings herein.

While there are still tolerances in relative position of the multiple cores in a multicore fiber, they are often tighter tolerances than experienced by arraying multiple individual fibers. The accurate relative placement of each of the multiple cores in a fiber sometimes result from manufacturing techniques where fiber preforms or boules are accurately constructed and the relative position accuracy is passed on to the multicore fibers in the optical fiber drawing process.

Figure 6:
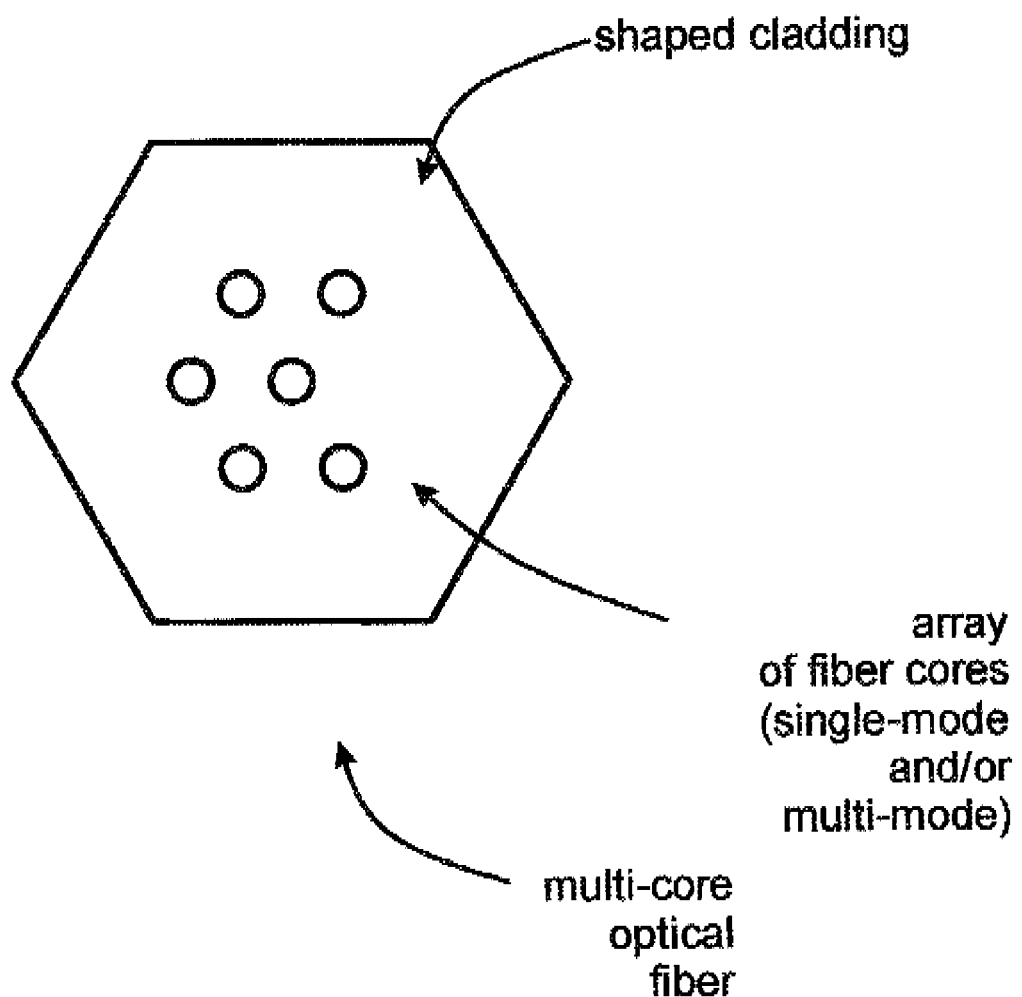
FIG. 6 shows an asymmetric array of cores in a hexagonally shaped multicore fiber.

It is also possible to shape the cladding and/or the coating (and/or the jacketing) of a single or multicore fiber. For example, this can be accomplished by shaping the boule or preform used in fabricating the fiber before the pull (or draw) is made. An example of this is shown in FIG. 6, where the cladding is hexagonally shaped. While the following descriptions reference shaped cladding, the optional coating may be shaped in place of or in addition to the shaped cladding. Similarly mechanical housings or structures on the multicore fibers which are aligned to the multicore arrays can be used in place of or in addition to the shaped cladding and/or coating.

In FIG. 6, an asymmetric array of cores is shown in the hexagonally shaped multicore fiber. In this fiber the cladding has been hexagonally shaped. This is useful since it can facilitate the arraying of multiple multicore fibers while preserving relative orientations between the arrays of cores in neighboring multicore fibers.

Figure 7:
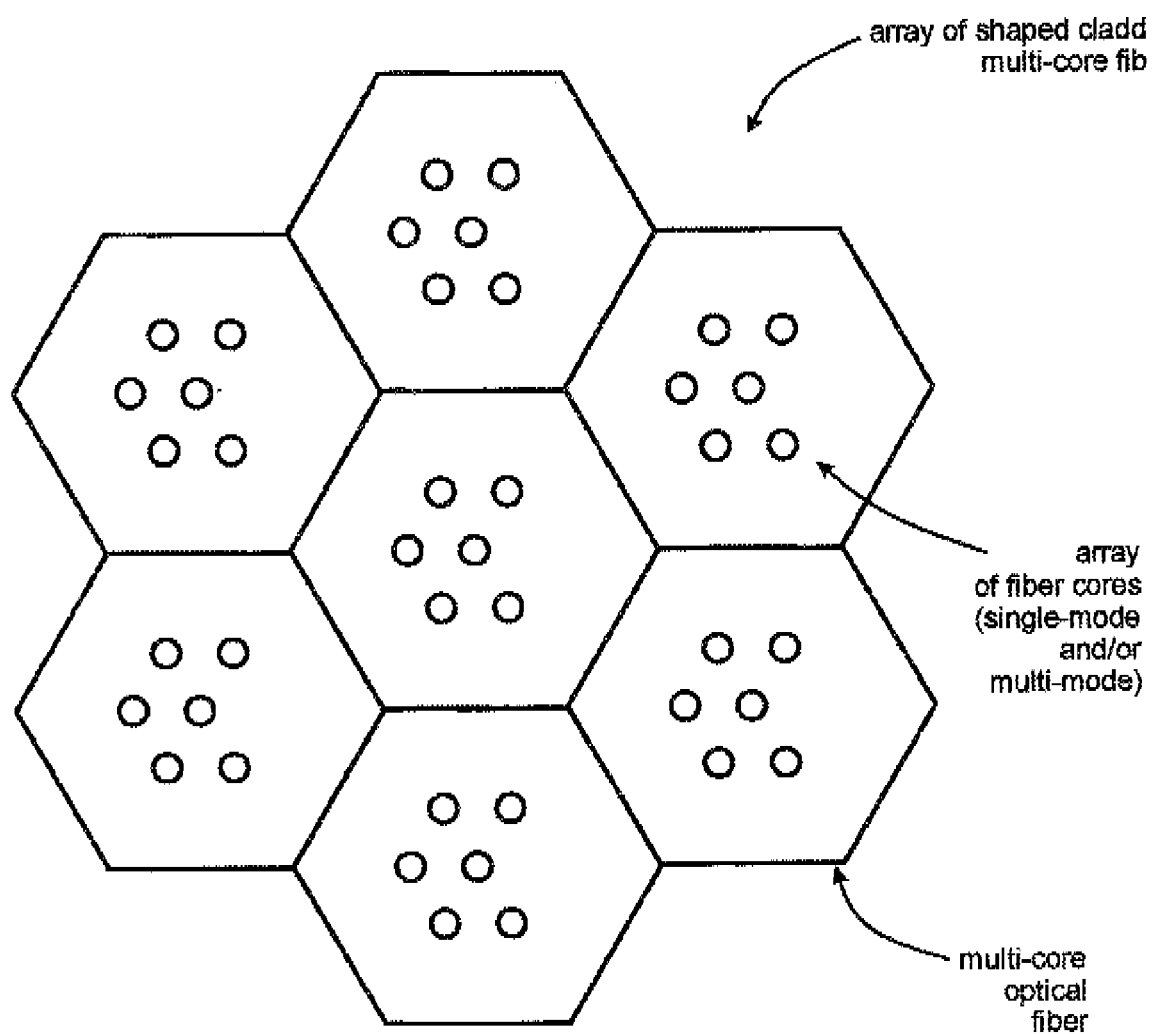
FIG. 7 shows an exemplary embodiment of an oriented array that preserves relative orientations of the array of fiber cores.

An example of this is shown in FIG. 7, where seven multicore fibers are shown in an oriented array that preserves relative orientations of the array of fiber cores in each of the multicore fibers across the array of multicore fibers. In some embodiments of the present teachings, multicore structures, or arrays or structures of multicore fibers such as shown in FIG. 7, and in FIGS. 3-9, can be used to replace one or more optical fibers, or the "array of optical fibers" and "optical fiber arrays" and "pre-aligned arrays of optical fibers", etc., described in the incorporated references cited herein.

Figure 8:
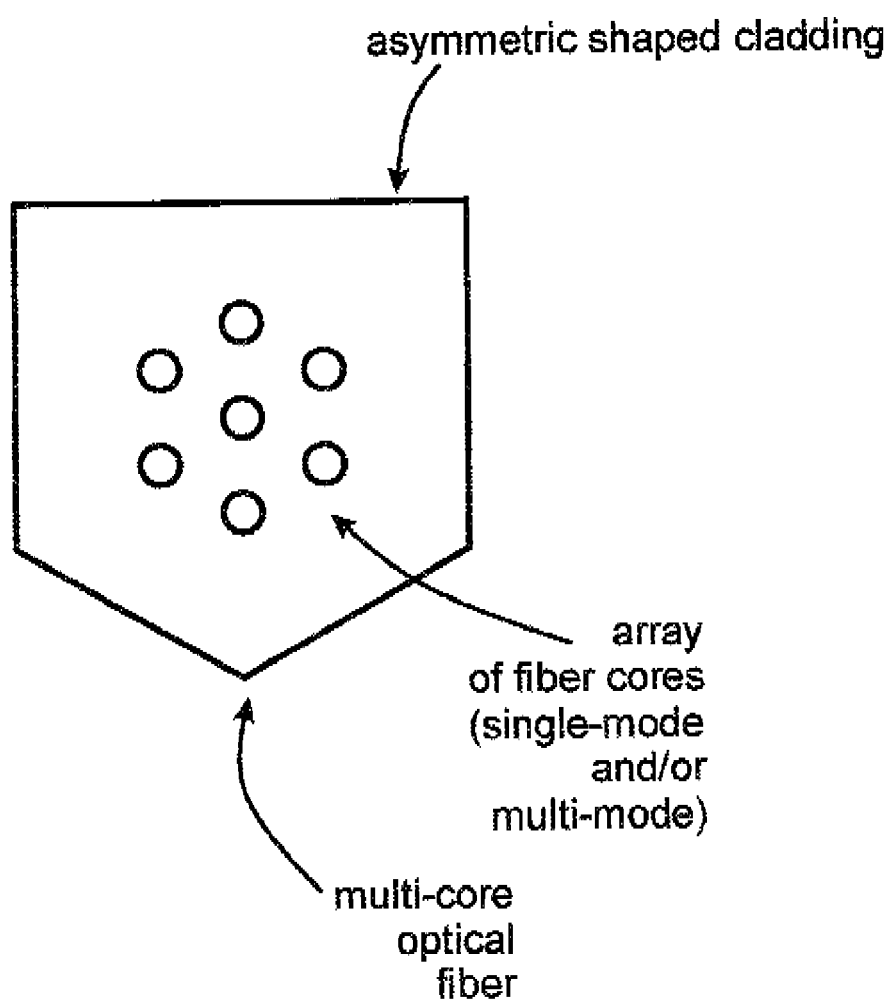
FIG. 8 shows an exemplary embodiment of a cladding of a multicore fiber that is asymmetrically shaped.

In another configuration of the present teachings, the cladding (and/or coating, fibers, multicore fibers, fiber arrays, and arrays of multicore fibers) of a multicore fiber can be asymmetrically shaped. An example of such a configuration is shown in the FIG. 8. In FIG. 8, the multicore fiber has seven cores arranged in a hexagonal array. The cladding is asymmetrically shaped so that orientation of the cladding will automatically orient the array of cores in the multicore fiber. And insertion into or onto shaped divots in imagers (or more generally in alignment or input plates, which accurately position fibers and can be incorporated in imagers or as imager inputs) can similarly orient and/or align the multicore fiber in the fiber arrays, imagers, or connectors described in the incorporated references. This shaping of fiber elements is typically easy to accomplish because, for example, if the boule or pre-form is shaped prior to pulling the fiber, the relative orientation between the shape of the boule and the array of cores in the boule will commonly be preserved in the fiber that is produced by pulling the boule or preform. This is a key structure that can improve the fiber splice and fiber interconnect geometry described in U.S. Pat. No. 9,594,214 which is incorporated herein by reference in its entirety for all purposes.

While in FIGS. 5-8 the claddings are shown with particular shapes, similarly the cores, coatings, assemblies and arrays of multicore fibers (as in FIG. 7) can be shaped to facilitate orientation and alignment in optical fiber connectors including the ones incorporated by reference herein.

For example and without limitation, by matching the shape of the divots in the face of the infinite conjugate imager to that of the shaped cladding, individual fibers and multicore fibers and arrays of multicore fibers may be accurately placed and/or aligned, including the alignment of the array of cores in the multicore fibers, by placing or inserting the shaped fiber onto or into the shaped divot and cementing and/or bonding and/or fusing and/or optically affixing the fiber to the infinite conjugate imager. In one set of configurations of the present teachings, in this fashion, an optical connector that connects single multicore optical fibers or alternatively connects multiple multicore optical fibers is produced by substituting one or more shaped optical fibers and shaped divots for the optical fibers and divots described in U.S. Pat. No. 9,594,214. By broadening the description of shaped cladding in FIGS. 6-9 to include shaped cores, shaped coatings, shaped assemblies and shaped arrays of multi-core fibers, additional configurations of the present teachings are described. In these additional configurations of the present teachings the shaped cladding labeled in the figures is replaced by fibers with shaped cores, fibers with shaped coatings, assemblies of shaped fibers, arrays of shaped fibers, etc. Here the fibers may be single core or multicore.

Figure 9:
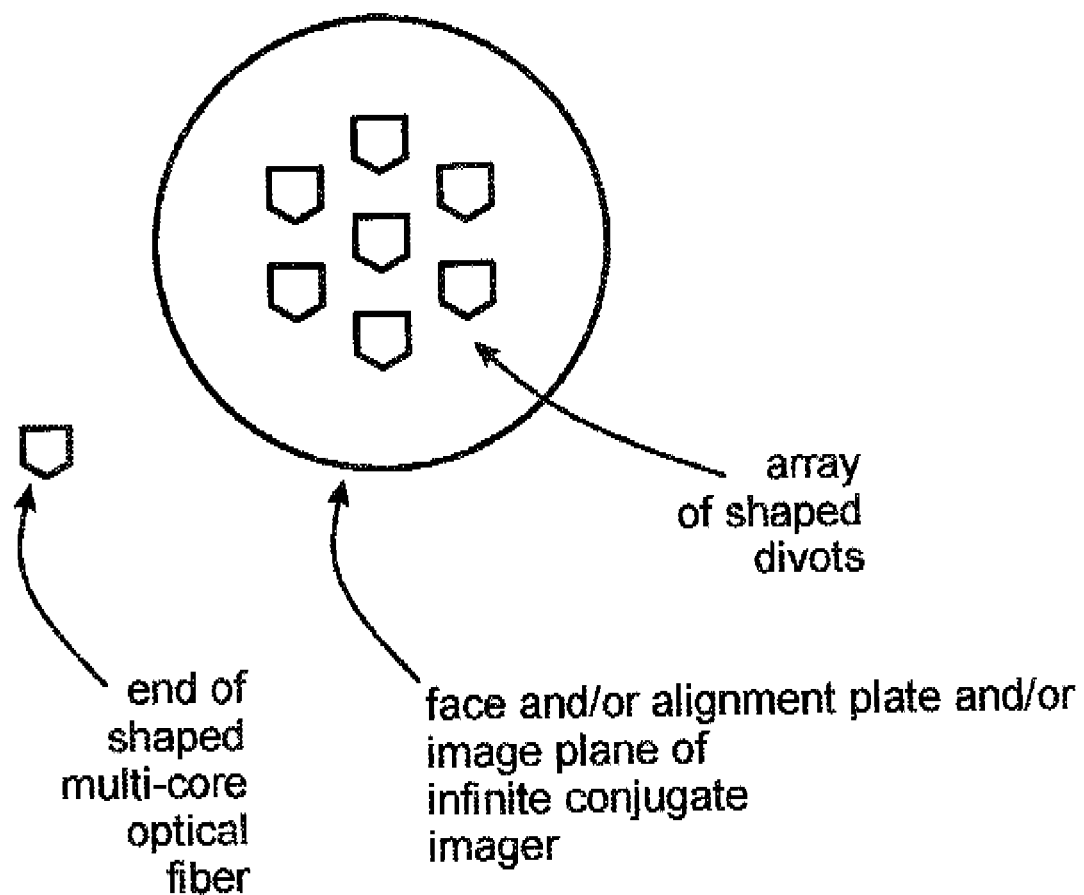
FIG. 9 represents an embodiment of an end phase surface of an imager as used in these teachings.

An embodiment of a connector of the present teachings is illustrated in FIG. 9. Here the end face of an infinite conjugate imager, or equivalently an input plate or element of an infinite conjugate imager which may be located in or near an image place of the imager, is shown with shaped divots. These divots mate to the shape of shaped multicore optical fiber, an example of which is shown at lower left in the figure. By placing one or more of the shaped multicore optical fibers into or onto one or more shaped divots, all of the cores in the array of multicore fibers can be oriented and/or aligned in the connector at once by maintaining the orientation of the infinite conjugate imagers in the optical connectors.

In a similar fashion, breakout and fanout from signals in the cores among single or multiple multicore fibers can be accomplished as described in U.S. patent application Ser. No. 11/777,170 which is incorporated herein by reference for all purposes, wherein the array of optical fibers as originally described is replaced by one or more multicore optical fibers that optionally make use of shaped cladding and/or coating to relatively orient the multicore fibers in any of the ways described above.

Figure 10:
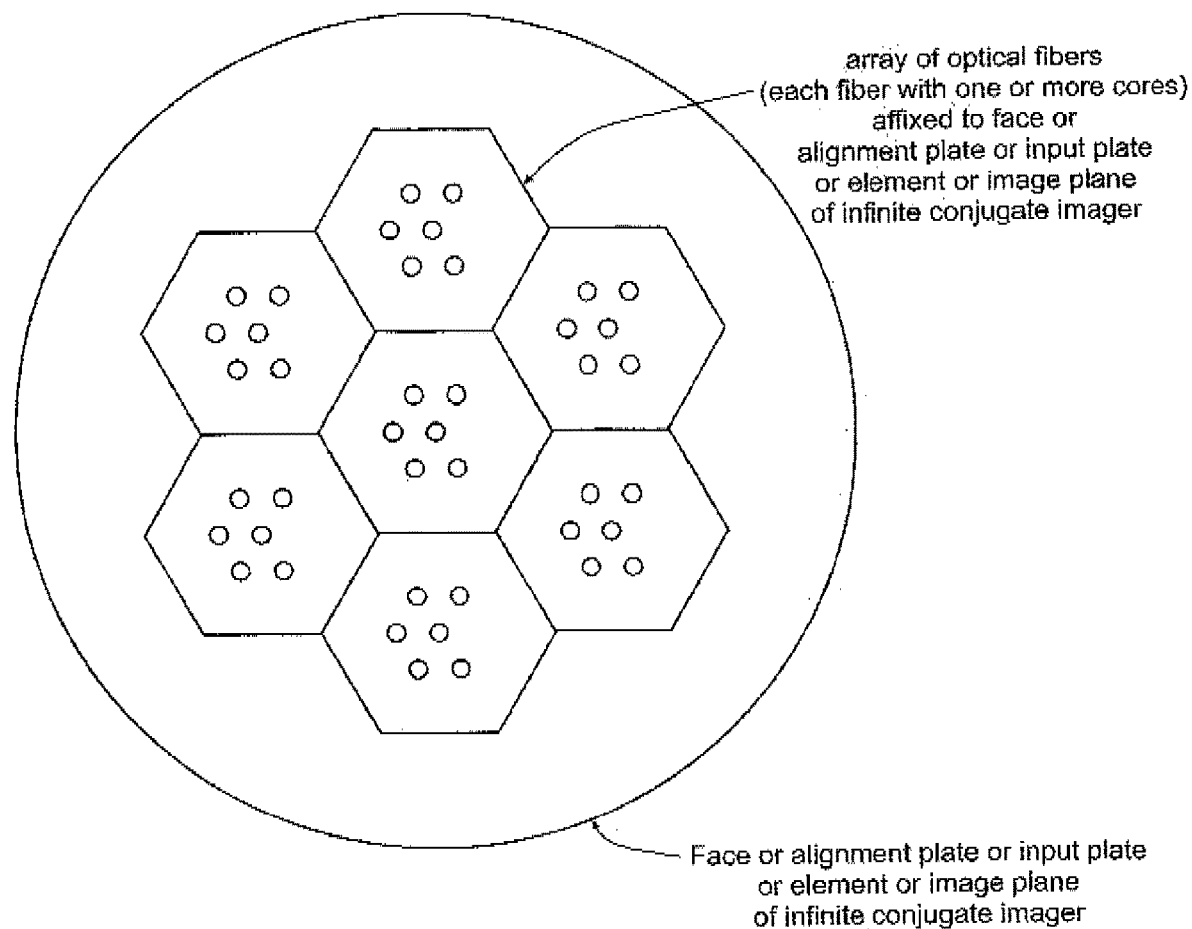
FIG. 10 shows a further embodiment of the present teachings.

FIG. 1 shows a part of many of the embodiments of optical connectors incorporated by reference herein wherein, in general, an array of optical fibers is input to an infinite conjugate imager. In FIG. 1 a rod lens is shown as an infinite conjugate imager, but in general other refractive, diffractive, reflective, or hybrid imagers can be used, typically at roughly or substantially or nearly infinite conjugates. In the embodiment of the present teachings shown in FIG. 9, individual shaped multicore fibers (for example with a shaped cladding and/or coating) are shown to be aligned and affixed in or on divots on a face and/or alignment plate and/or element and/or image plane of an infinite conjugate imager. FIG. 10 shows a further embodiment of the present teachings wherein an array of optical fibers, each fiber with one or more cores, is affixed to the face and/or alignment plate and/r element and/or image plane of an imager, used at substantially infinite conjugates. These fibers may be arranged in an array randomly or ordered for example and without limitation, by compression, electrostatic attraction, potting, geometric shape fitting, use of templates, adhesion, fusing, etc., In the embodiment shown in FIG. 10, the array of optical fibers is attached or affixed onto the imager by the use of, for example and without limitation, adhesives, optical adhesives, potting, mechanical fixturing, thermal fusing, optical contacting, or fitting the array of fibers shape into a divot as described earlier. One of these many preferred techniques for attaching the optical fiber array to the imager is fusing by fusing them, which can be accomplished in one step for the entire array of optical fibers, and typically offers benefits such as strong attachment, rapid attachment when desired alignment is achieved, low surface reflections, among many other advantages. This fusing can be accomplished, for example and without limitation, with the use of one or more electric arcs. This fusing attachment is applicable to the attachment of optical fiber arrays to imagers (or to elements or surfaces or input plates, etc. of imagers) in embodiments of optical connector described herein and in the optical connector patents that have neem incorporated by reference herein.

The term alignment is used herein to include positional alignment as well as orientational alignment. Individual shaped fibers, or on a larger scale shaped arrays of fibers, can both be aligned positionally and/or orientationally by sizing the shaped divot to receive either individual shaped fibers or an array of fibers that has a particular shape that matches a correspondingly sized and shaped divot or indentation. It should also be noted that alignment of shaped optical fibers (or shaped arrays of fibers) by inserting them into shaped divots in an alignment surface or alignment plate is useful not only for aligning the fibers in an infinite conjugate imager, but is useful for aligning optical fibers, each with one or multiple cores, for input into more general optical systems including but not limited to finite conjugate imagers, connectors, image planes, optical devices, electro-optical devices, etc. The terms alignment surface, alignment plate, imager input, element of an imager, face of an imager, image plane of an imager, alignment plate of an imager, etc. are used herein interchangeably.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present teachings, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although the teachings have been described with respect to various embodiments, it should be realized these teachings are also capable of a wide variety of further and other embodiments within the spirit and scope of the appended claims.

What is claimed is:

1. An optical interconnect comprising:
   an array of optical fibers;
   an imager with substantially infinite conjugates;
   said array of optical fibers having an end portion;
   said array of optical fibers including at least one optical fiber with multiple cores;
   wherein the multiple cores in said at least one optical fiber with multiple cores are arranged in arrays of cores;
   said at least one optical fiber with multiple cores further comprising a structure;
   said structure configured to align said arrays of cores in said at least one optical fiber with said array of optical fibers;
   said array of optical fibers operatively connected to said imager;
   said imager forming an image of said end portion of said array of optical fibers substantially at infinity.

2. The optical interconnect of claim 1 wherein said structure comprises a noncircular shape.

3. The optical interconnect of claim 2 wherein said noncircular shape comprises an asymmetric shape.

4. The optical interconnect of claim 1 wherein said structure comprises a mechanical housing or structure.

5. The optical interconnect of claim 1 wherein a relative orientations of said arrays of cores is preserved across the said array of optical fibers.

6. An optical interconnect comprising:
   one or more optical fibers; at least one optical fiber from the one or more optical fibers being a shaped optical fiber;
   one or more optical fibers of said at least one optical fibers from the one or more optical fibers having a noncircular shape;
   at least one of the one or more optical fibers having multiple cores; symmetry in an array of cores of the at least one optical fiber having multiple cores being broken such that individual cores are readily identified by a position of the individual cores, an imaging subsystem;

said at least one optical fiber having an end portion;

said imaging subsystem comprising an optical alignment surface;

said optical alignment surface comprising at least one shaped divot;

said at least one optical fiber being aligned by insertion of said end portion into said at least one shaped divot;

said one or more optical fibers operatively connected to said imaging subsystem.

7. The optical interconnect of claim 6 wherein said at least one optical fiber is attached to said optical alignment surface by fusion.

8. The optical interconnect of claim 6 wherein said at least one optical fiber comprises shaped cladding.

9. The optical interconnect of claim 6 wherein said at least one optical fiber comprises shaped coating.

10. The optical interconnect of claim 6 wherein at least one shaped optical fiber in said array of at least one shaped optical fibers comprises more than one core.

11. The optical interconnect of claim 6 wherein said imaging subsystem has substantially infinite conjugates.

12. An optical interconnect comprising:

a shaped array of optical fibers; said optical fibers being multicore optical fibers: said shaped array being oriented such that relative orientations of an array of fiber cores in each multicore optical fiber is preserved;

an imaging subsystem;

said shaped array of optical fibers having an end portion;

said imaging subsystem comprising an optical alignment surface;

said optical alignment surface comprising a shaped divot;

said shaped array of optical fibers being aligned by insertion of said end portion into said shaped divot;

said shaped array of optical fibers operatively connected to said imaging subsystem.

13. The optical interconnect of claim 12 wherein said shaped array of optical fibers are attached to said optical alignment surface by fusion.

14. The optical interconnect of claim 12 wherein at least one optical fiber from said shaped array of optical fibers his shaped.

15. The optical interconnect of claim 12 wherein said imaging subsystem has substantially infinite conjugates.

* * * * *